Feb. 7, 1967     V. D. ROOSA     3,302,663
PILOT VALVE SYSTEM FOR FLUID ACTUATED FASTENER DRIVING MACHINES
Original Filed Aug. 2, 1963     3 Sheets-Sheet 1
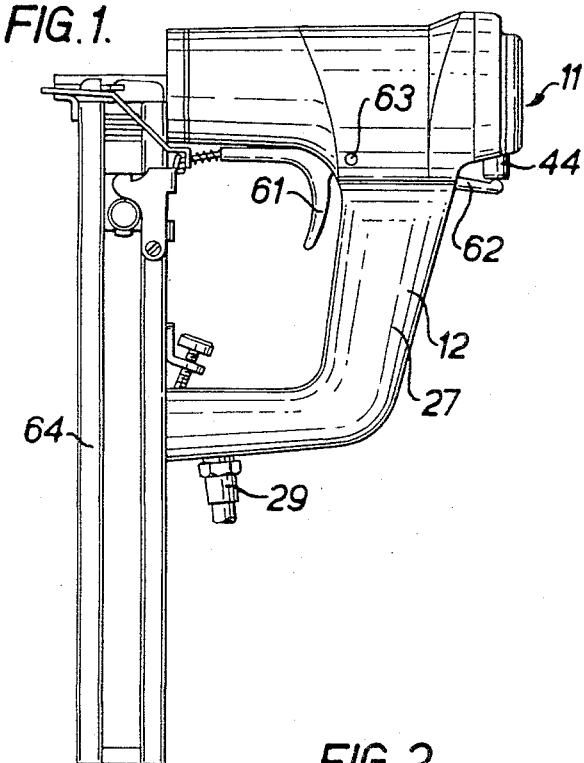
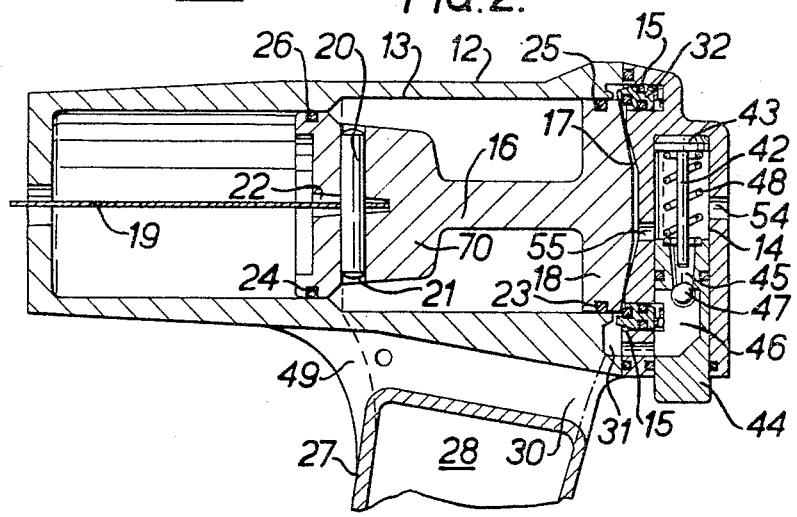
INVENTOR
VERNON D. ROOSA
BY J. Walton Bader
ATTORNEY Feb. 7, 1967     V. D. ROOSA     3,302,663
PILOT VALVE SYSTEM FOR FLUID ACTUATED FASTENER DRIVING MACHINES
Original Filed Aug. 2, 1963     3 Sheets-Sheet 2
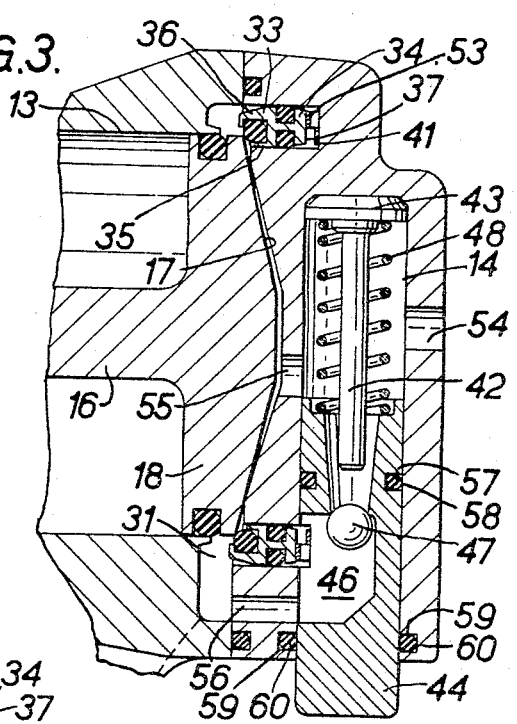
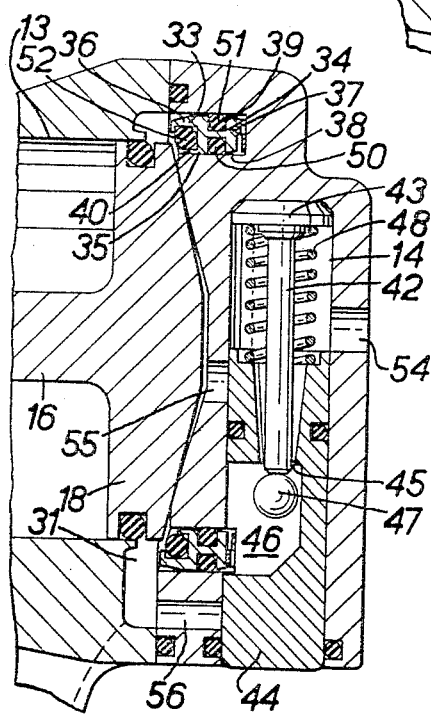
INVENTOR
VERNON D. ROOSA
BY J. Walton Bader
ATTORNEY

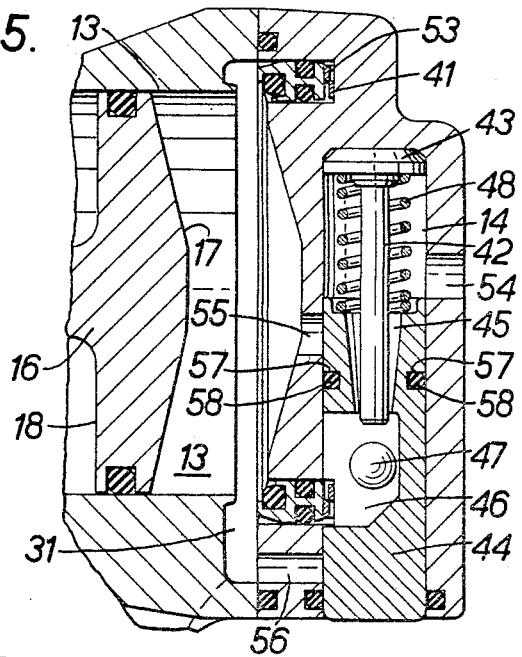
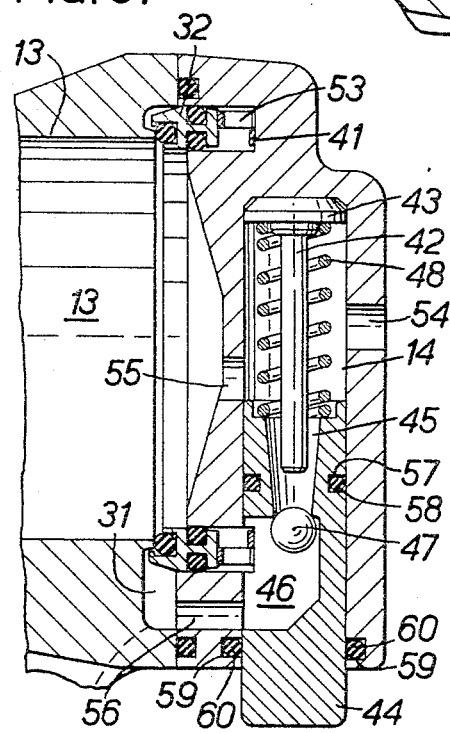

United States Patent Office 3,302,663
Patented Feb. 7, 1967

3,302,663
PILOT VALVE SYSTEM FOR FLUID ACTUATED
FASTENER DRIVING MACHINES
Vernon D. Roosa, 184 Wood Pond Road,
West Hartford, Conn. 06111
Original application Aug. 2, 1963, Ser. No. 299,589.
Divided and this application July 7, 1965, Ser. No. 470,011
1 Claim. (Cl. 137—596)

This invention relates to a pilot valve system for fluid actuated fastener driving machines. This is a divisional application of my parent application, Serial No. 299,589, filed August 2, 1963, now abandoned. Another divisional application, Serial Number 470,041, filed July 7, 1965, now United States Patent 3,242,825 contains claims directed to a differential area motor utilizing in connection with this invention. Another divisional application, Serial Number 589,774, filed October 5, 1966 contains claims to a valve structure for use in connection with a fastening device. The instant case contains claims directed to the pilot valve system set forth hereinabove.

In fluid actuated fastener driving machines and in other devices of similar type it is advantageous to employ pilot valve structures to control the operation of the device. Prior art pilot valve structures have been bulky, expensive, and failure-prone. The structure of the instant invention is simple and easy to manufacture, requires relatively few parts, and relatively little servicing.

The invention will be further described by reference to the accompanying drawings which are made a part of this specification.

FIG. 1 is a side view, on a reduced scale, of a fluid actuated fastener driving machine embodying the instant invention.

FIG. 2 is a fragmentary sectional view through the center line of the housing of the machine shown in FIG. 1. The valve mechanism is shown in normal rest position.

FIG. 3 is an enlarged fragmentary sectional view of a portion of the showing of FIG. 2 with the parts in the same position as that shown in FIG. 2.

FIG. 4 is a view similar to that of FIG. 3 but with the actuating valve shown in the position that it assumes immediately upon firing the device.

FIG. 5 is a sectional view similar to that of FIG. 3 showing the position of the parts as the control valve is actuated and the piston commences its downward stroke.

FIG. 6 is a view similar to that of FIG. 2 but showing the position of the parts immediately after release of the trigger with the piston commencing its upward movement.

The invention will now be further described by reference to the specific modifications thereof shown in the accompanying drawings which represent the best modes known to the inventor of taking advantage of the same. In this connection, however, the reader is cautioned to note that the specific modifications shown are for purposes of illustration and example only. Various changes and modifications may obviously be made within the spirit and scope of the inventions and would occur to those skilled in this art.

The fluid operated fastener driving machine 11, in connection with which the control means described in this specification are employed, comprises a housing 12 which is provided with a piston sleeve 13, an actuating valve sleeve 14, and a control valve sleeve 15 therewithin. A piston 16 is reciprocatingly movable within piston sleeve 13 and is formed with a driving surface which is divided into a first element 17 at the upper portion of piston 16 and a second element 70 spaced therefrom. A return surface 18 is beneath element 17 and is of smaller operational area than the total operational area of element 17 and element 70. A driver blade 19 is connected to piston 16 at its lower portion by pin 20 passing therethrough which is in turn disposed within hole 21 cut through piston 16. Driver blade 19 floats within piston 16 by means of cut-out portion 22 provided beneath pin 20.

Piston 16 is also provided with perimetral grooves 23 and 24 laterally thereupon and sealing members 25 and 26 (preferably O-rings) are disposed within grooves 23 and 24 respectively so that piston 16 is sealed within sleeve 13.

Housing 12 is provided with an offset arm portion 27 which is hollowed out at 28. A pressure air duct 29 communicates with space 28 and serves to conduct pressure air into space 28. A first conduit 49 communicates with piston sleeve 13 and thence with return surface 18 of piston 16. A second conduit 30 communicates with space 28 and space 31.

A control valve member 32 (preferably circular) is formed with a hollow body 33 having a roof portion 34 (preferably substantially flat) thereupon. Body 33 is also formed with an interior side portion 35, and exterior (preferably inwardly tapering) side portion 36 and a base portion 37. Perimetral grooves 38, 39 and 40 are preferably provided within each of portions 35, 36 and 37 respectively. Resilient perimetral sealing members 50, 51 and 52 (preferably O-rings) are disposed within each of grooves 38, 39 and 40 respectively. A perimetral spring 41 having projections 53 is disposed within control valve sleeve 15 and abuts roof portion 34 of body 33 normally holding control valve member 32 in position normally blocking admission of pressure air to element 17 of piston 16.

Actuating valve means are disposed within actuating valve sleeve 14. These means preferably comprise a stem member 42 having an enlarged base portion 43, a slider 44 provided with a first recess 45 wider than the width of stem 42 and a contiguous second recess 46 wider than recess 45, a ball 47 seated at the junction between recesses 45 and 46, and a coil spring 48 disposed about stem 42 and abutting slider 44.

A first opening 54 is provided within actuating valve sleeve 14 which is open to atmosphere at all times. A second opening 55 communicates with element 17 of the driving surface of piston 16 and a third opening 56 communicates with space 31 and normally communicates with recess 46.

A groove 57 is preferably provided within slider 44 and a perimetral sealing member 58 (preferably an O-ring) is disposed within groove 57. An additional groove 59 is preferably provided within housing 12 adjacent slider 44 and an additional perimetral sealing member 60 (also preferably an O-ring) is disposed within groove 59 so as to prevent leakage of pressure air past slider 44.

A trigger 61 bears an arm 62 which abuts slider 44. Trigger 61 is pivotally movable about pin 63.

A magazine 64 is provided for the feeding of fasteners to be driven and to present a fastener successively to driver blade 19. Magazine 64, however, forms no part of this invention.

With the foregoing specific description the operation of this invention may now be explained.

The device is connected to a source of pressure fluid (preferably pressure air) and magazine 64 filled with fasteners to be driven. In the normal rest position of the device before trigger 61 is pulled (see FIGS. 2 and 3), the pressure air abuts return surface 18 of piston 16 and element 70 of the driving surface thereof, actuating valve sleeve 14 is open to atmosphere, and control valve member 32 blocks admission of pressure air to element 17 of the driving surface of piston 16. Control valve member 32 is held in blocking position by the balance of pressure air thereupon acting downwardly from recess 46 (passing therein through opening 56) and upwardly from space 31. The blocking position is insured by the downward pressure of spring 41. Piston 16 is maintained in rest position because the operational area of surface 18 is greater than the operational area of surface 70.

When trigger 61 is pulled arm 62 thereof pushes slider 44 inwardly and thus causes stem 42 to unseat ball 47. At the same time slider 44 blocks openings 55 and 56. As a result of this movement pressure air in space 31 acts upon control valve body 33 while the counter pressure formerly present in recess 46 has been bled to atmosphere because of the unseating of ball 47. Thus control valve body 33 rises (see FIG. 5) and permits pressure air to abut element 17 of the driving surface of piston 16. Since the addition of driving surfaces 17 and 70 of piston 16 have a greater operational area than that of return surface 18 thereof piston 16 is driven downwardly to drive a fastener within magazine 64 into work.

Piston 16 will remain in down position so long as trigger 61 is held in pulled position. When trigger 61 is released slider 44 is propelled by spring 48 into the normal rest position. At this point (see FIG. 6) opening 55 is now open to atmosphere and opening 56 communicates with recess 46. Thus pressure air is now admitted to recess 46 but, because ball 47 is initially unseated, passes out to atmosphere through recess 45 and opening 54. This rush of air propels ball 47 into its seat between recesses 45 and 46 and thus blocks further escape of pressure air from recess 46. However, the portion of pressure air which abutted element 17 of the driving surface of piston 16 is now permitted to exhaust to atmosphere through openings 54 and 55. Thus the only pressure air acting upon piston 16 is the air acting on return surface 18 and an element 70 of the driving surface of piston 16. The operational area of surface 18 is greater than the operational area of element 70 so that piston 16 is propelled upwardly. As piston 16 moves upwardly the driving surface 17 thereof contacts control valve body 33 (through O-ring 52) and forces body 33 upwardly to its normal rest position. The device may be again actuated by pulling trigger 61 and will go through another cycle.

What is claimed is:

For use in a fluid actuated fastener driving machine valve mechanism comprising a circumferential movable control valve member, actuating valve means operatively connected to said control valve member, said actuating valve means including a slider member therewithin movable to engaged and disengaged positions and provided with a first recess and a contiguous wider second recess, a ball normally seated at the junction between said first and second recesses, a stem member narrower than said first recess and normally extending therewithin short of said ball, a coil spring member about said stem abutting said slider, movement of said slider to engaged position unseating said ball and thus actuating said control valve member, movement of said slider to disengaged position allowing seating of said ball.

References Cited by the Examiner

UNITED STATES PATENTS

| | | | |
|---|---|---|---|
| 1,332,544 | 3/1920 | Davis | 251—25 X |
| 2,593,564 | 4/1952 | Ives | 251—28 |
| 2,648,349 | 8/1953 | McGarry | 251—25 X |
| 2,698,729 | 1/1955 | Cox et al. | 251—25 |
| 2,751,182 | 6/1956 | Snyder | 251—28 |
| 2,888,953 | 6/1959 | Gratzmuller | 251—25 X |
| 3,055,344 | 9/1962 | Fisher | 91—417 |
| 3,084,672 | 4/1963 | Dalton | 91—417 |

M. CARY NELSON, *Primary Examiner.*

A. ROSENTHAL, *Assistant Examiner.*